United States Patent
O'Mahony et al.

(10) Patent No.: US 9,495,132 B2
(45) Date of Patent: Nov. 15, 2016

(54) RELEASE MANAGEMENT SYSTEMS AND METHODS

(75) Inventors: James O'Mahony, Lodi, CA (US);
Suneesh Raman, Karnataka Pin (IN);
Archit Garg, Karnataka Pin (IN);
Sylvio Tagalog, Fremont, CA (US);
Jagannath Subramanian, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1257 days.

(21) Appl. No.: 12/349,435

(22) Filed: Jan. 6, 2009

(65) Prior Publication Data
US 2010/0017784 A1 Jan. 21, 2010

Related U.S. Application Data
(60) Provisional application No. 61/080,960, filed on Jul. 15, 2008.

(51) Int. Cl.
*G06F 9/44* (2006.01)
(52) U.S. Cl.
CPC ..................... *G06F 8/20* (2013.01)
(58) Field of Classification Search
CPC ..................................................... G06Q 10/06
USPC ........ 703/1–22; 707/790–812; 715/200–277, 715/733–759; 717/101–104; 719/315–316
See application file for complete search history.

(56) References Cited

U.S. PATENT DOCUMENTS

| | | | | |
|---|---|---|---|---|
| 5,857,107 | A * | 1/1999 | Tsuchida ....................... 717/170 |
| 6,678,671 | B1 * | 1/2004 | Petrovic et al. |
| 7,207,009 | B1 * | 4/2007 | Aamodt ................. G06Q 10/06 715/772 |
| 7,624,053 | B1 * | 11/2009 | Molotsi et al. .................. 705/35 |
| 8,234,620 | B1 * | 7/2012 | Bychkov et al. ............. 717/100 |
| 2003/0058277 | A1 * | 3/2003 | Bowman-Amuah G06F 17/30607 715/765 |
| 2003/0110067 | A1 * | 6/2003 | Miller .............. G06Q 10/06313 705/7.23 |
| 2004/0068517 | A1 * | 4/2004 | Scott ....................... G06Q 10/04 |
| 2005/0114829 | A1 * | 5/2005 | Robin .................... G06Q 10/06 717/101 |
| 2005/0171963 | A1 * | 8/2005 | Barrett ................... G06Q 10/06 |
| 2005/0216882 | A1 * | 9/2005 | Sundararajan et al. ...... 717/104 |
| 2005/0289503 | A1 * | 12/2005 | Clifford ........................ 717/101 |
| 2006/0053043 | A1 * | 3/2006 | Clarke ............. G06Q 10/06311 705/7.17 |
| 2006/0123388 | A1 * | 6/2006 | Choi et al. .................... 717/101 |
| 2006/0179155 | A1 * | 8/2006 | Bunting et al. ............... 709/232 |

(Continued)

*Primary Examiner* — Insun Kang
*Assistant Examiner* — Sergio J Curbelo, III
(74) *Attorney, Agent, or Firm* — Osha Liang LLP

(57) ABSTRACT

Progress of a development cycle, such as for the development of a release of a software product, is tracked and managed using a release management system. Such a system allows groups and managers to retain any project planning or status files, in any appropriate structure. A manager can simply upload the file to the system as information is updated, and the system will apply appropriate templates and store the information in such a way that reporting and tracking can be done for any aspect of the development process at any level. For example, a single system can provide a high-level executive overview down to a detail level view of a particular group, using substantially current data for all aspects the process.

14 Claims, 9 Drawing Sheets

(56) References Cited

U.S. PATENT DOCUMENTS

| | | | |
|---|---|---|---|
| 2006/0235732 A1* | 10/2006 | Miller | G06Q 10/06 705/7.23 |
| 2007/0011541 A1* | 1/2007 | Kogan et al. | 714/737 |
| 2007/0027810 A1* | 2/2007 | Longnecker et al. | 705/51 |
| 2007/0067308 A1* | 3/2007 | Amrhein et al. | 707/10 |
| 2007/0143744 A1* | 6/2007 | Clemm | G06F 8/71 717/128 |
| 2008/0263505 A1* | 10/2008 | StClair et al. | 717/101 |
| 2009/0037520 A1* | 2/2009 | Loffredo | H04L 63/105 709/203 |

\* cited by examiner

| Project Management | Dependencies | Uploaded Files | MPP Audit | Top Issues | Trending |

Release Version  
(All Choices) ▼

Product Family  
(All Choices) ▼

Product  
(All Choices) ▼

Release Milestone  
(All Choices) ▽

Dev Area  
(All Choices) ▼

Deliverable Type  
4-7: FDD ▼ Go

Work by Family

| Family | Start Date | Finish Date | % Complete | Count | Deliverable Type |
|---|---|---|---|---|---|
| CPM | 26-Feb-07 | 27-Oct-08 | 1.3% | 58 | 4-7: FDD |
| CRM | 11-Aug-06 | 16-May-08 | 32.6% | 124 | 4-7: FDD |
| FIN | 16-Mar-06 | 31-Jul-08 | 24.0% | 217 | 4-7: FDD |
| HCM | 15-Sep-06 | 22-May-09 | 18.3% | 423 | 4-7: FDD |
| LCM | 01-Dec-06 | 29-Jun-07 | 64.0% | 2 | 4-7: FDD |
| null | 27-Apr-07 | 18-Mar-08 | 1.1% | 3 | 4-7: FDD |
| PRC | 07-Jun-06 | 28-Mar-08 | 23.3% | 99 | 4-7: FDD |
| PRJ | 01-Sep-06 | 28-Sep-07 | 55.5% | 38 | 4-7: FDD |
| SCM | 06-Oct-06 | 24-Aug-09 | 21.3% | 359 | 4-7: FDD |
| SETUP | 30-Mar-07 | 10-Mar-08 | 16.0% | 16 | 4-7: FDD |

| MPP Upload | Change Request Summary | Top Issues |
| MPP Upload | MPP Upload History | MPP List |

MPP Upload History

| Upload ID ▼ | File Name | Parsed | Last Updated By | Updated On | Frequency | Warnings File |
|---|---|---|---|---|---|---|
| 25705 | File name 1 | false | User 1 | 10-may-07 09:00:04 by | 06 | |
| 25308 | File name 3 | false | User 2 | 10-MAY-07 09:00:09 by | 58 | |
| 25112 | File name 4 | false | User 3 | 11-MAY-07 00:19:14 by | 05 | |
| 25305 | File name 5 | false | User 4 | 10-MAY-07 08:27:54 by | 3 | |
| 25304 | File name 6 | false | User 5 | 10-MAY-07 00:25:45 by | 54 | |
| 25708 | File name 7 | false | User 6 | 10-MAY-07 08:05:30 by | 50 | |
| 25792 | File name 8 | false | User 7 | 10-MAY-07 07:09:09 by | 30 | |
| 25706 | File name 9 | false | User 8 | 10-MAY-07 06:51:17 by | 12 | |
| 25789 | File name 10 | false | User 9 | 10-MAY-07 06:22:50 by | 22 | |

FIG. 6

Change Request

| Field | Value |
|---|---|
| CR ID | Not Assigned |
| CR Owner | Frank Jones |
| Release | Fusion VO |
| Change Request For | TDD |
| Product | Trading Community |
| Document Name | TCA_Date_Effectivity_TTD.xml |
| Escalation Level | N/A |
| CR Type | Add |
| CR Status | Approval Pending |
| Reason For Change | |
| CR Summary | We need to change the title of the document from TCA Date Effectivity TTD to "TCA Date Effectivity TDD" |
| Implications Of Not Implementing | References to other documentation will be affected. |

[Save] [Restore] [Create] [Back to Summary]

[MPP Upload] [Change Request Summary] [Top Issues]

Top Issues Summary

| | Title | ETA | Exec Sponsor | Escalation Level | Regression Status | Resolved | Last Updated |
|---|---|---|---|---|---|---|---|
| ⦿ | CRM Schedule Uncertainty | 10-APR-07 | N/A | Executive | N/A | Resovec | Fri, 4 May 2007 16:08 PM |
| ○ | Emailing ADF Regions | | Alan Fothergil | Division | Yes | Open | Fri, 4 May 2007 10:23 AM |

[Create] [Update]

| MPP Upload | Change Request Summary | Top Issues |

Issue Details

[ Back to Issue List ] [ Restore ] [ Update ] [ Create ] [ View History ]

Top Issue

Requestor GREG.SEIDEN@ORACLE.COM     Last Updated By GREG.SEIDEN@ORACLE.COM

*Title: CRM Schedule Uncertainty     Escalation Level: Executive ▼

*Details: CRM Plans need to be re-evaluated to confirm deveopment ability and commitment.     ETA: 10-APR-07

*Impacts: Milestone dates need to be reconfirmed     Exec Sponsor: N/A ▼

Regression Status: N/A ▼

Root Case:     Status: Resolved ▼

Product Family: CRM ▼

Comments:

RELEASE MANAGEMENT SYSTEMS AND METHODS

CROSS-REFERENCES TO RELATED APPLICATIONS

This application claims the benefit of U.S. Provisional Application No. 61/080,960 entitled "Release Management Systems and Methods", filed Jul. 15, 2008, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to tracking and managing information for multiple groups or sources, and in particular to tracking and managing information relating to the development of a particular version or release of a software product.

Large software companies typically have trouble keeping track of the progress of development and other aspects of various software releases at both a high-level and a lower, more detailed level. This can be problematic, as executive management may wish to know or easily determine the status of an overall application release in general (i.e., the high-level status). Similarly, development managers may be interested in tracking the daily progress of their engineers with regard to specific tasks, metrics, or other performance items. In one example, this translates into a percentage complete of the developers' coding tasks (i.e., the detailed-level status.) Current systems and approaches lack the ability to track both levels of data in one system at the same time, while providing an adequate high-level status derived from the detail-level data.

One previous solution was to manually update a high-level status report. Development managers would individually keep track of their engineering work in separate project plans, in an application such as Oracle Projects from Oracle Corporation of Redwood Shores, Calif., or Microsoft Project from Microsoft Corporation of Redmond, Wash. The development managers would check regularly (e.g., weekly) to determine how their engineers were progressing, then estimate and enter a "percentage complete" into a high-level reporting system. The managers might also write their own ad hoc reports in the technology of their choice if their project data was in a database, and use these various reports to demonstrate progress to upper management. While such approaches allow for flexibility with respect to development team styles and approaches, it can be difficult to integrate the various approaches and time consuming for managers to constantly generate a current high level view. Further, it can be difficult for a manager to estimate things like a completion date when the manager does not know the status of a portion from another team upon which the date depends. The high-level reports also are based on manually-entered data, which results in reports that show only a snapshot-in-time of the release progress, and results in a high frequency of data errors since updates are done manually and not derived directly from the project data source.

Another solution was to save project plan files to a central server, using an application such as Microsoft Project Server. The data from the project plan files then could be saved into appropriate tables for subsequent querying and reporting. These reports allow for both high level and detailed level views. While such an approach is beneficial from the reporting standpoint, it typically requires using standardized approaches that might not be optimal for various development teams. Such an approach might require a team to change the way it enters or tracks data, which can be time consuming and/or undesirable to the team manager. Further, these approaches might not be sufficiently customizable to address new concerns as they arise. Further still, such a solution is not particularly easy to use in many instances, and can be relatively slow.

BRIEF SUMMARY OF THE INVENTION

Systems and methods in accordance with various embodiments of the present invention provide for the tracking and management of the progress of a development cycle, such as for the development of a release of a software product, using a release management system. Such a system allows groups, managers, and other appropriate users to retain any project planning or status files, in any appropriate structure. A manager can simply upload the file to the system as information is updated, for example, and the system will apply the appropriate templates and store the information in such a way that reporting and tracking can be done for any aspect of the development process at any level. For example, a single system can provide views at multiple levels, such as from a high-level executive overview down to a detail level view of a particular group, using substantially current data for all aspects the process.

In one embodiment, information relating to a development process is tracked by receiving a development file from each of a plurality of sources. In this example, each source is responsible for an aspect of the development process, and each development file can have a data structure that is unique to a respective one of the sources. A template can be applied to data in each development file when received, in order to allow the data in each development file to be stored using a common structure. The data can then be validated after applying the template(s), and the respective source can be notified when at least some of the data is determined to be invalid. Validated data for each received development file can be stored using the common structure. An authorized user then is able to run reports against the stored data, where the reports can include views at multiple levels, such as from an overview of a status of the entire development process down to a detailed view of a status for each individual source.

In one embodiment, the reports include substantially current information for each source based on stored data for each source. Each development file can be uploaded by a user or application for the respective source. The development process itself can relate to any appropriate development cycle, such as a development cycle for a software product.

When determining whether the data is valid, a system in accordance with one embodiment bases the determination at least in part upon rules determined for the development process.

A user of one such system is provided with the ability to highlight an issue relating to the development process. The user then is able to run a report for the issue using the stored data.

In one embodiment, a first source is able to indicate a dependency upon data of a second source. This dependency information then can be utilized when running a report for the first source, such as to determine projected status and completeness information. The dependencies themselves can be stored as mappings in a table. Upon receiving data for a source, related data can be automatically updated for any other source.

In one embodiment, a user is able to submit a change request for an aspect of the development process, a report capable of being run for the change request. The user also can be provided with the ability to view an upload and download history for the development process.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 3 illustrates an example interface that can be used in accordance with one embodiment;

FIG. 6 illustrates an example interface that can be used in accordance with one embodiment;

FIG. 7 illustrates an example interface that can be used in accordance with one embodiment;

FIGS. 8(a) and (b) illustrate example interface portions that can be used in accordance with one embodiment;

DETAILED DESCRIPTION OF THE INVENTION

Figure 1:
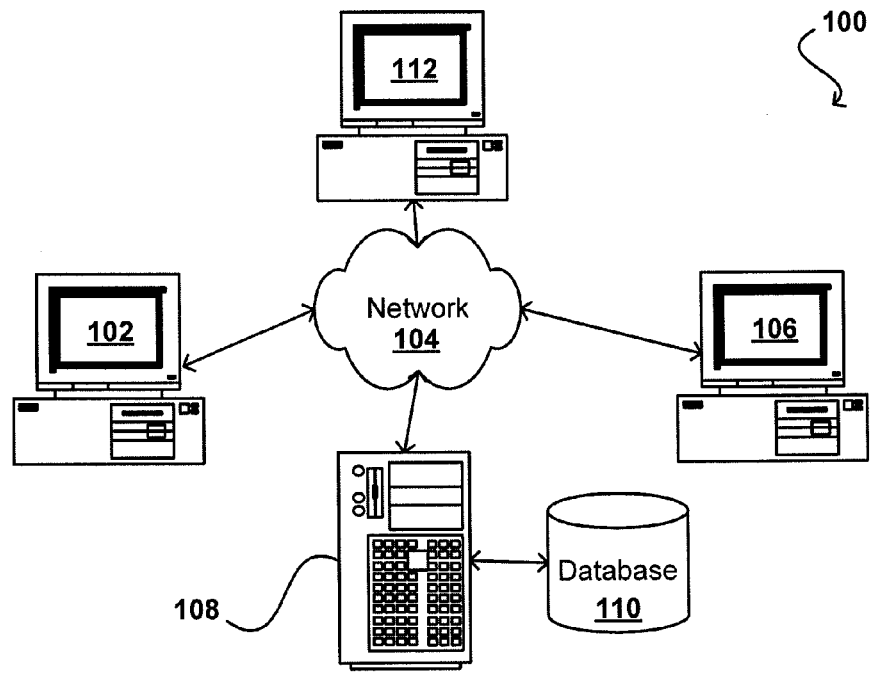
FIG. 1 illustrates an example environment in which aspects of various embodiments can be implemented.

Systems and methods in accordance with various embodiments can overcome the aforementioned and other deficiencies in existing information management approaches by providing the ability to track and estimate software development at a much more detailed level, and with a much higher degree of accuracy. Such an approach can lead to a more productive software release cycle, and in turn allow a developer to deliver more competitive products. A release management system can provide a beginning-to-end structure where an entire release process, along with any key pieces, can be tracked and the information managed.

A release management system (RMS) in accordance with one embodiment provides for real-time reporting at multiple levels. Reports are based on actual data sources, not manually updated estimates for values such as "percent work complete," etc. Enabling real-time reporting on multiple levels means that development teams can enter and use data to report on their progress, both for themselves and for their team members, for example. Further, executive management (i.e., upper management) is able to use the same data to create aggregate reports across many of these development teams. Such a tool is far more valuable and reliable to both high and detailed-level report consumers than previous solutions that relied upon manual entry.

An RMS also allows users to simply upload a project plan file, or capture the current file, which significantly reduces the amount of work needed to enter or upload project data into a reporting system. For example, uploading data for a previous solution took over 2 minutes for a small file, while an upload module in accordance with one embodiment took less than 10 seconds for the same data.

Using such an upload module approach also can validate project data on upload, and can provide the user with appropriate warnings or errors, such as many be based on rules determined by the application division. Such an approach is an improvement over certain previous solutions, which did not provide hooks for validation and cannot be customized.

A release management system (RMS) in accordance with one embodiment also provides an advantage of a module such as a "Top Issues" module. Such a module can provide a distinct location for logging and tracking issues that program managers may wish to bring to the attention of upper management, for example. Certain prior solutions provided issue and risk fields, but were limited to task and project level issues, did not pertain to suite, family level, or similar issues, and did not provide the associated functionality described herein.

A RMS also can include a dependencies database, table, etc., wherein users are able to associate a task for a release with other portions which must be completed to a certain point before that task can be started and/or completed. A dependencies-based implementation is advantageous as such an implementation can be leveraged to better determine completion dates for each portion of a project. For example, a given team might be able to complete a task in six weeks, but that team might not be able to start work for another twelve weeks due to various dependencies that must occur before that team can begin work. By including this information in the system, and by updating dates according to the dependencies, each team is able to better determine an accurate completion date for their portion. Further, the updating of a date for one team can automatically update any affected date for any associated dependency, such that any report will include the most accurate completion information.

A release management system (RMS) in accordance with one embodiment also provides an advantage of a module such as a "change request" module, which allows RMS users to log and track the status of requests for changes to the range of objects that can be reported on in RMS. For example, requirements documents that are tracked in RMS can be locked down once the documents are complete. Users can be required to submit a request that a change be made once the documents have been locked down. A change request module allows RMS users to enter their requests in the system, report on the requests, and input additional information, such as impacts, status, reviewers, approvers, and other additional information needed for someone to evaluate the change request. Another user of the system can view the changes that are relevant to that user as a worklist, for example, then open up the change request and approve, reject, or otherwise update the change request as deemed appropriate.

A release management system (RMS) in accordance with one embodiment also provides an advantage of a module such as a "divisional master schedule" module. Such a module can provide a distinct location for logging and tracking definitions of high level product releases that program managers define and report on the status of completion for upper management, for example. Certain prior solutions provided a way to track release information, but were limited to those definitions and did not tie to or enable aggregate reporting on task and project level data. A DMS module is somewhat similar in level to the top issues module described previously, but in at least one embodiment contains data that tracks high level release definitions only. This data then can be tied to information such as project level data, top issues, change requests, etc., through the RMS system, and can be reported on accordingly.

FIG. 1 illustrates an exemplary environment 100 in which aspects of various embodiments can be implemented. As will be appreciated, different environments may be used, as appropriate, to implement various embodiments. The environment 100 shown includes electronic client devices 102, 106, each of which is used by a separate development team to enter progress and other such information for a particular software release or similar version or product. The client devices can include any appropriate device operable to receive information, as well as to send and receive requests, messages, or information over an appropriate network 104 and convey information back to a user of the device. Examples of such client devices include personal computers, cellular telephones, handheld messaging devices, laptop computers, set-top boxes, and personal data assistants. The network 104 can include any appropriate network, including an intranet, the Internet, a cellular network, a local area network, or any other such network or combination thereof, using various protocols and components for communicating discussed elsewhere herein. Communication over the network can be enabled by wired or wireless connections, and combinations thereof. As shown, the client devices can send information over the network that is received by an application server 108 that typically will be running an instance of at least a portion of the release management system and will store information to an appropriate data storage device(s) 110. The environment also includes at least one client device 112 programmed to allow a user at the executive level, for example, to access the data in the data storage device 110 or at least run queries or reports on the data. The users of the other client devices 102, 106 also can run queries or reports according to their roles or permissions, as discussed elsewhere herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

A release management system (RMS) in accordance with one embodiment provides for the tracking of release or version status at multiple levels, such as a high-level appropriate for executive overviews, and a detailed level appropriate for team or developer-level review. Such a system can accomplish this multi-level functionality by providing a single easy-to-use approach that is based upon, but is not limited to, existing project data. High-level reports can be generated that are aggregates of detailed project data, both of which are viewable through the RMS. Since high-level data, such as "percent complete" at the Suite or Family level, is based on detailed project data, any change in the detailed project data is automatically reflected in the high-level reports. This allows a report at any level to correspond to the most recent information, regardless of the level at which the information was entered. Further, other data sources can be integrated into RMS, thereby allowing systems such as quality assurance (QA), strategy, product management, and bug tracking systems to be integrated into the system and contribute to the high-level status reports as well.

Because an RMS can have up-to-date information about every aspect of a project, the system can generate substantially accurate numbers relating to the completion percentage of a project or task, which is based on the numbers an information available for each task or portion of the project. For example, the RMS can determine that 20% of a deliverable is complete according to the schedule, plan, and data, instead of relying upon a person estimating how far along a particular project is, as in many previous approaches. Further, if the system reports that a deliverable is 20% complete, a user can be provided with the ability to drill down to determine how that number was generated, such as by looking at each completed portion, as well as the status of every pending portion. The 20% number thus comes from the tool itself, and is not a guess or estimate of a user.

Figure 2:
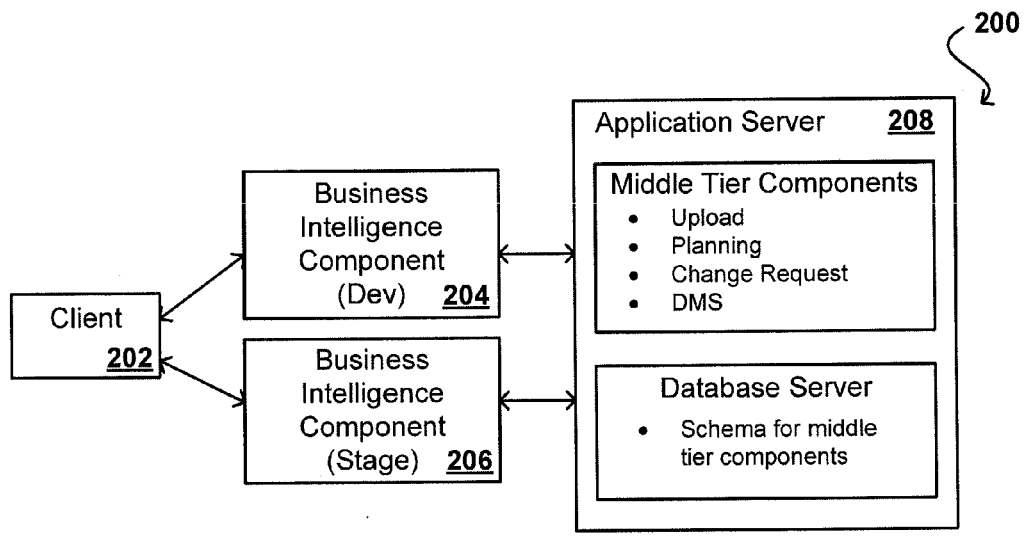
FIG. 2 illustrates an example architecture that can be used with various embodiments.

In one example, the integration is accomplished using an Oracle Business Intelligence Enterprise Edition (OBIEE) toolset, which forms the reporting engine portion of RMS. As illustrated in the exemplary architecture 200 of FIG. 2, a client 202 (such as any of the client devices discussed with respect to FIG. 1) can interface with an application server 208 through at least one such business intelligence component, such as one for the development side 204 and one for the staging side 206. As shown, the intelligence component(s) can allow the client to access elements such as the RMS modules and database server discussed elsewhere herein. An OBIEE toolset also allows users at any level to report on any kind of database information, including not only software release information but also additional functionality such as that described below.

FIG. 3 illustrates an exemplary display 300 that can be used with an RMS in accordance with one embodiment. In this display, it can be seen that there are a number of options 302 for narrowing down or selecting the type of information shown. The illustrated options include options to select information by release version, product family, product, milestone, development area, and deliverable type, although various other options can be used as would be apparent to one of ordinary skill in the art in light of the teachings and suggestions contained herein. In this example, information 304 for various product families is displayed for a specified delivery type. As can be seen, the information includes the starting date along with an estimated finish date. The information also includes a percent complete field, so that a user viewing the report can easily determine where the families are in respect to each other in the development process.

Figure 4:
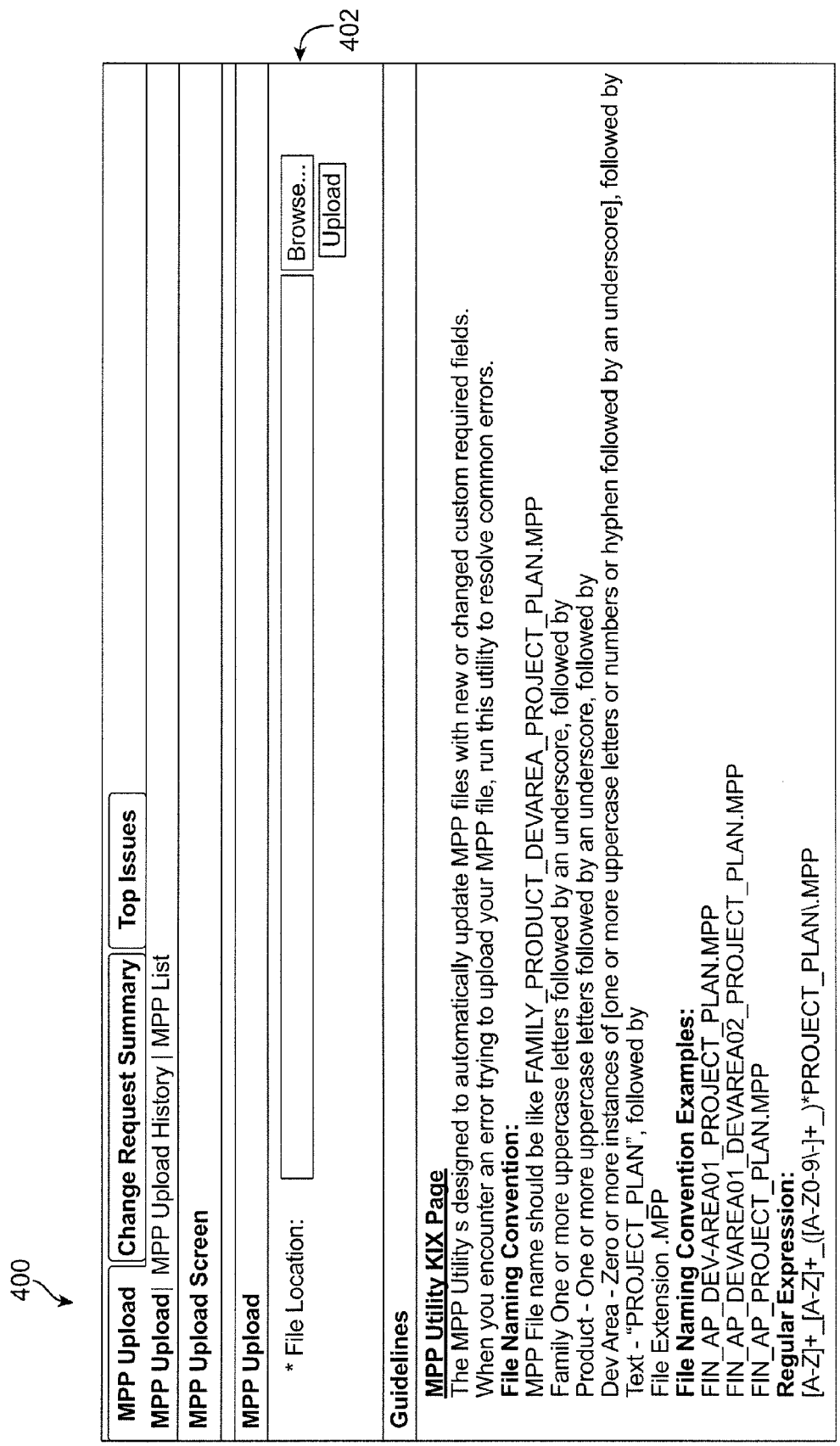
FIG. 4 illustrates an example interface that can be used in accordance with one embodiment.

In order to include information for the various teams in such a report, it can be necessary for each team to store, enter, upload, or otherwise provide the information, or otherwise make the information available to the system. In one embodiment, a user is able to upload project pages using a project upload module. Such a module allows data to be uploaded in any structure useful for a given team, which increases the flexibility of the system while reducing the impact on existing team approaches. An example 400 of such an upload page is illustrated in FIG. 4. The page or interface for an upload module can be comprised of customer JSP (Java Server Pages) pages, for example, which can use open source code such as MPXJ (Microsoft Project Exchange in Java) or other appropriate code to allow users to upload project plan files into the RMS system. The functionality of this module is simple but efficient, as users can upload the project plan files into the RMS system by using a browse 402 or similar function to locate the file, then select an option to upload the located file. The upload module can have some level of validation capability built in, such that users are able to audit the project plan files before the files go into the RMS. Audits include checking the file for standards created by a program management team, for example. A utility can be provided to attempt to solve common errors in the uploaded files, and various conventions and requirements can be used as desired to simplify the uploading, storing, and tracking process. In other embodiments, pages may be uploaded into the system automatically each time the data is updated.

Figure 5:
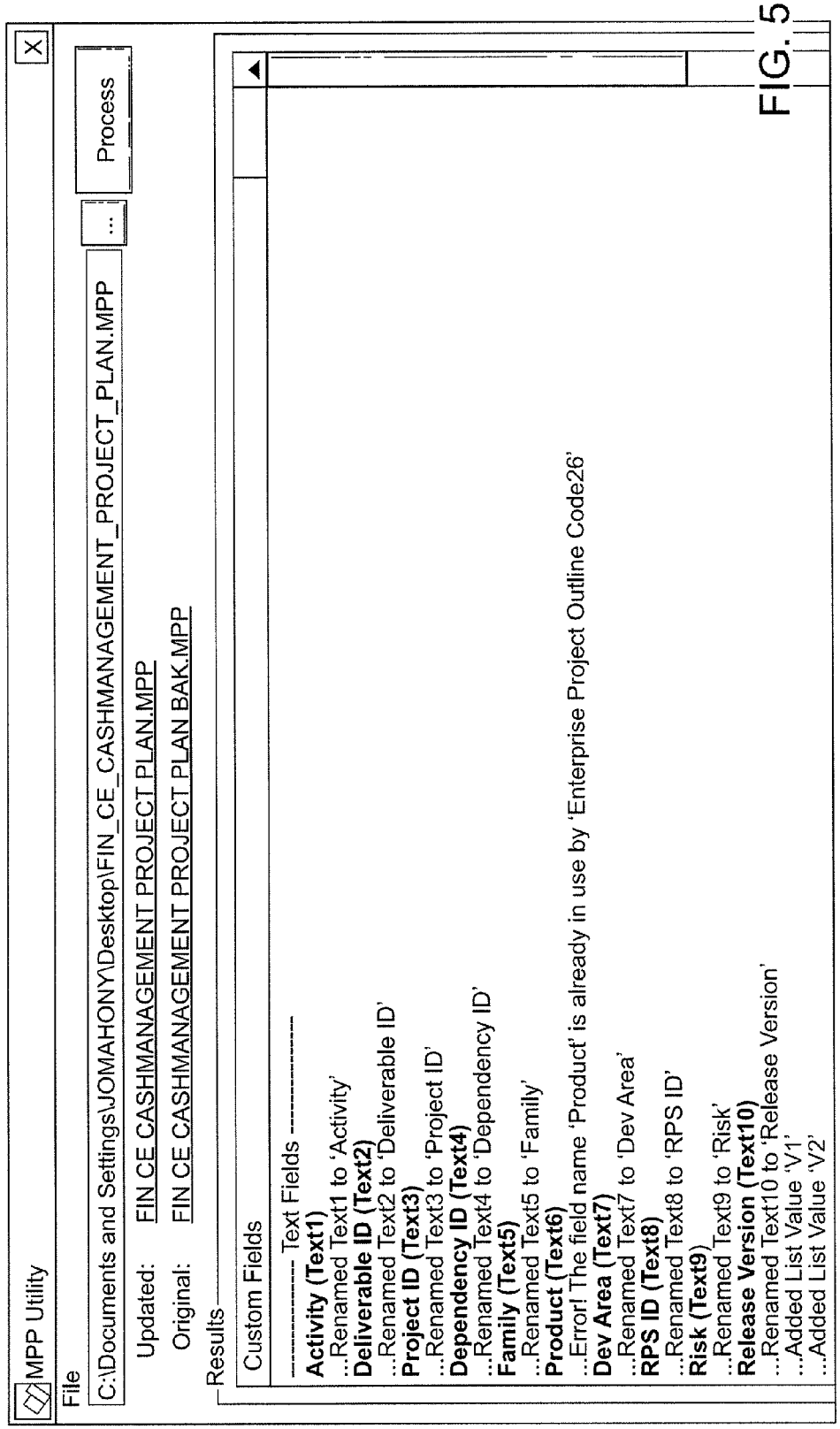
FIG. 5 illustrates an example interface that can be used in accordance with one embodiment.

FIG. 5 illustrates an example of an updater interface 500 that allows users to update their project plan files to utilize the latest template, for example. As shown, the interface shows the filename of both the original project plan file and the file that has been updated with the latest template. The interface also shows the changes made in the update, such as the renaming of particular fields. Such an updater allows information uploaded by a project team member to easily be adapted to the appropriate format, so that reports can be run across teams, families, groups, or other appropriate entities.

One benefit to using such an upload process is that the RMS can provide an upload history interface 600, such as the one illustrated in FIG. 6. An upload history feature can allow users to both upload and download project plan files from the RMS, and allows a user to easily determine which files are most up-to-date. The interface thus provides a single-source-of-truth repository functionality for RMS users. FIG. 7 illustrates another interface page 700, which allows a user to request changes to the system objects, such as documents, code, etc., in RMS. Such a page helps formulate the request, as a user is prompted to enter information relating to the release, product, etc. The user also is able to input information such as a reason for the suggested change, a summary of the requested change, and an implication of not implementing the change. It should be understood that the term "page" as used herein is used for purposes of simplicity of understanding, and that any other appropriate way of communicating such information can be used as well, such as any of a number of interfaces, windows, panels, frames, screens, pop-ups, messages, etc.

As another useful feature, an RMS interface can include at least one page 800, 850 for a Top Issues (TI) module, such as is illustrated in FIGS. 8(*a*) and (*b*) for one embodiment. A Top Issues or similar module can provide a distinct location for logging and tracking issues that program managers or other authorized users might wish to bring to the attention of upper management, such as for purposes of highlighting problems, improvements, new features, etc. These issues then can be presented to upper management as the "top issues" to be considered and/or addressed, for example. While certain previous approaches includes issue and risk fields, these were limited to task and project level issues, and do not pertain to suite, family level, or other such issues, and do not provide access to the wealth of other information available. A first page portion 800 illustrates a listing of "top issues" that can be reviewed. In this example, a user has selected to view an issue called "CRM schedule uncertainty." A second page portion 850 shows information for the selected issue, here showing information such as details for the issue and a listing of features or other aspects that are impacted by the issue. A top feature can be tied to a project, allowing a manager or executive overseeing the project to view details at a high level, drill down to get more detail and determine progress on particular portions of the issue, see who will be impacted by each portion and notify those persons, etc. In certain instances, an authorized user is able to approve, reject, or make suggestions for all or a portion of the issue. Methods for authorizing, validating, authenticating, and/or assigning roles, permissions, or security policies to a user are well known and will not be discussed herein in detail.

In a use case for a particular embodiment, data is mapped to a release from beginning to end. For example, a strategy person might use a tool such as a divisional master schedule to enter a new idea for a product, and provide information such as a working name, release, and information such as basic ideas and concepts. In previous approaches, such information was typically entered and/or provided by building a Web page and providing the link to management, etc. Once the initial release information is entered, another group might engage in program management using a tool such as a release planning tool, including information for each initial action item for the release, which can be incorporated as part of the RMS, or can reside as a standalone tool. The program management also can include information regarding which products and/or groups might be affected by the release, and/or required to perform some action item as part of the release. Prior approaches were typically manual in nature, such as might utilize spreadsheets to map out and track information. Instead, data can be entered and loaded into a database tied to the master schedule module, and this information can be uploaded into the RMS via an appropriate plan file, for example. A report then can be generated indicating the progress of the release from both a strategy and program management point of view. An RMS interface can allow the strategy and management to update the schedule and tasks, such as to designate items as "in-scope" or "out-of-scope," and then automatically update schedules, assignments, and impacts as necessary. For each action item, a developer can enter plan information, such as how long a particular task should take, the amount of required resources, etc. As this information is entered and updated, the overall schedule, estimates, and information are updated accordingly. Once the overall schedule and tasks are determined to a sufficient level, the project plan is locked down such that any changes must be approved before being made. From this point, each developer or team manager is responsible for the appropriate portion(s), and can enter, update, and upload information as it becomes available. Since the data upload process allows for a variety of data structures, user can still utilize the formats they used previously for such purposes, minimizing the impact and retaining the flexibility for those users. While developers and managers can each decide to utilize a standardized page or file, a manager can instead decide to still utilize an individualized approach using a different style for the project plan, and can still generate reports on different Web pages, for example. The RMS provides them the flexibility to retain these approaches, while providing the ability to simply upload these pages, with minimal if any changes, such that the information is available in the RMS system and can be reported on at any appropriate level. The managers can still utilize their individual reports, however, if so desired.

At some point during the development process, each of these developers or teams may work on a portion of the release. After the planning and design stages, many of these teams will actually go through a coding stage. This stage can include tasks such as building the application, writing the appropriate code, doing unit testing, etc. Information for each of these tasks can be uploaded to the RMS system as available. Further, the project plans in the system can indicate which unit tests are to be used for a given unit of work. A report on a given group can include up-to-date information such as when a unit of work was completed, when the unit was designed, how the unit moved over into development, how many unit tests were created for that development, how the unit test's metrics are moving forward, etc. A user thus is able to continue to see the health of the project from inception through strategy and planning to the development phase, where users can determine how developers are doing on their unit testing. There also can be other phases that enter information and are tracked in a similar fashion, such as functional testing phases. Any other phases or stages, such as a watch stage for documentation, can be implemented and used with the RMS system in a similar fashion to provide a beginning-to-end solution.

In one embodiment, any object, item, unit, or other such tangible element can be considered a "deliverable" that will be provided at some point in the process. A deliverable can include a document, code, a set of QA results, etc., and can have an associated identifier that allows the deliverable to be easily identified, tracked, and mapped. The underlying framework can be implemented such that the data model is the same, whether an application uses deliverables or not. The metadata might be different, as would be known to the developer using the deliverable concept, but the data model can be the same and the same modules can be used. Where necessary, field such as release and version information can be appended to the data for a group in order to provide for reporting in the RMS system, while allowing the group to retain its current data structure.

Figure 9:
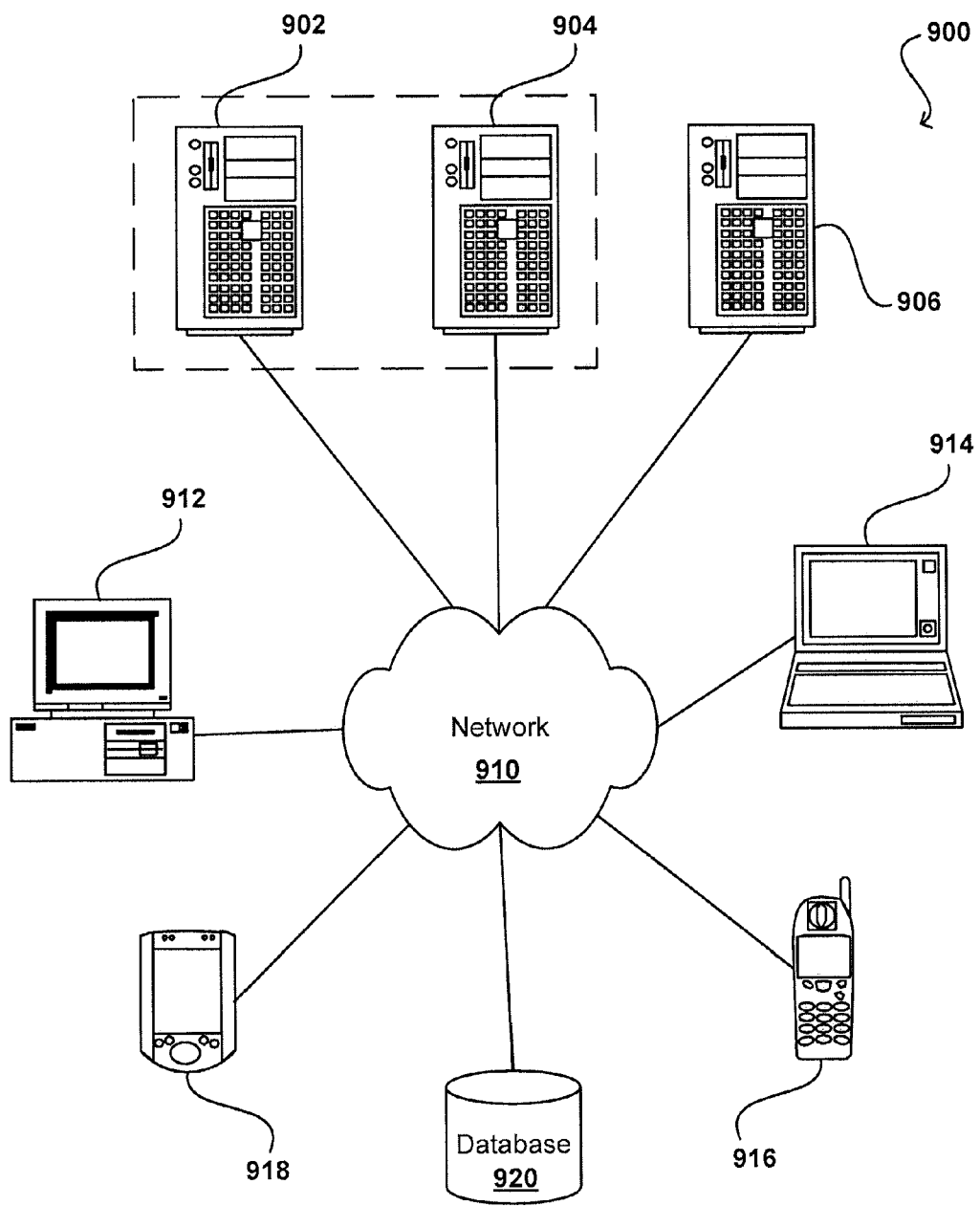
FIG. 9 illustrates components of a computer network that can be used in accordance with one embodiment of the present invention.

FIG. 9 is a block diagram illustrating components of an exemplary operating environment in which various embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network may can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
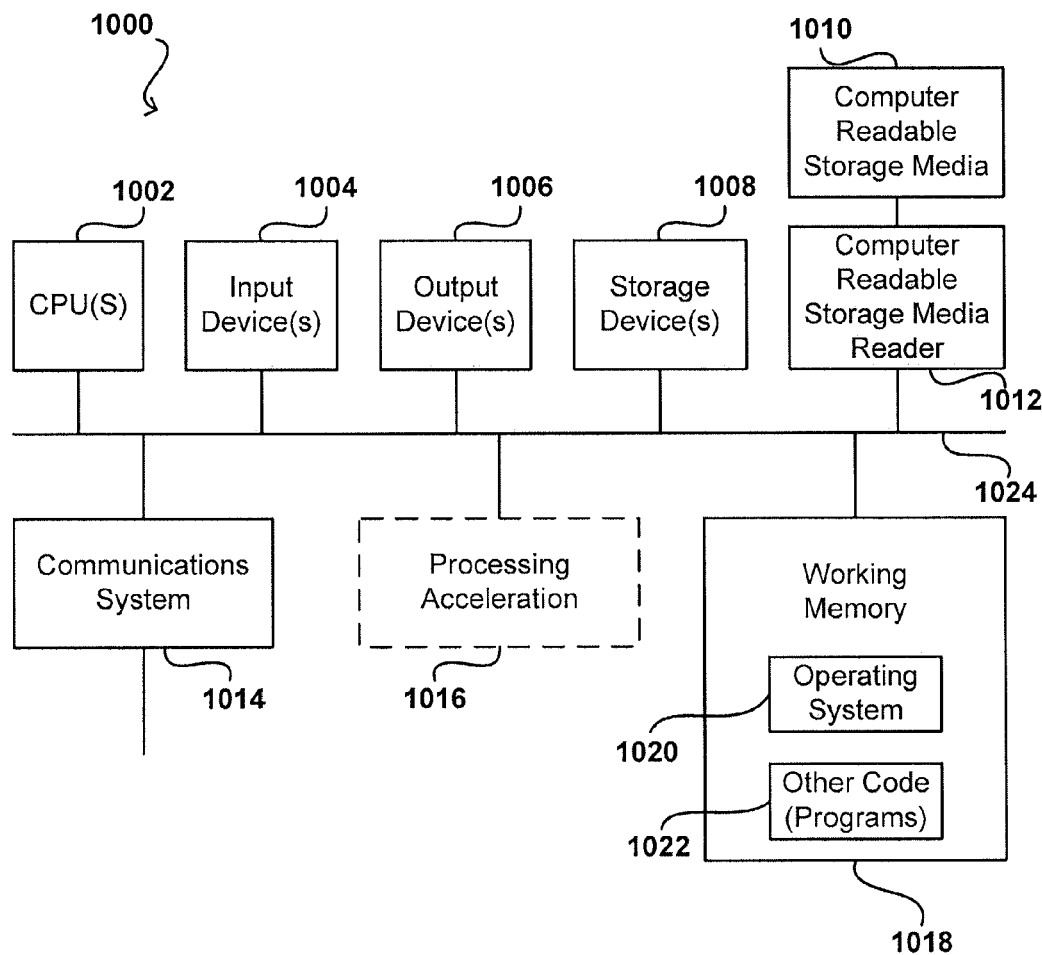
FIG. 10 illustrates components of a computerized device that can be used in accordance with one embodiment of the present invention.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for tracking information relating to a development process, comprising:
   receiving a first development file from a first source of a plurality of sources, each source of the plurality of sources assigned as responsible for an aspect of the development process, the first development file comprising project planning or project status information for the aspect of the development process for which the first source is responsible and indicating dependencies upon project planning or project status information from a second source of the plurality of sources, the dependencies indicating performance of a second set of one or more tasks being contingent on one or more extents of completion of a first set of one or more tasks;
   applying a template to data in the received first development file, wherein applying the template adapts the data in the first development file to a common structure, wherein the common structure supports reporting and tracking of all aspects of the development process across the plurality of sources;
   validating the data to identify first validated data after applying the template and notifying the first source when at least some of the data is determined to be invalid;
   storing the first validated data for the received first development file to create first stored validated data using the common structure and based on applying the template;
   storing the dependencies between the first development file and project planning or project status information from the second source as mappings to create stored mappings in a table, the stored mappings comprising the dependencies indicating one or more start times associated with the performance of the second set of one or more tasks being contingent on times associated with the one or more extents of completion of the first set of one or more tasks;
   updating upload history information related to the received first development file in response to storing the first stored validated data;
   receiving a second development file from a second source of the plurality of sources, the second development file comprising project planning or project status information for the aspect of the development process the second source for which is responsible, and wherein the first development file and the second development file have data structures unique to the respective source;
   applying the template to data in the received second development file, wherein applying the template adapts the data in the second development file to the common structure;
   validating the data to identity second validated data after applying the template and notifying the second source when at least some of the data is determined to be invalid;

storing the second validated data for the received second development file to create second stored validated data using the common structure and based on applying the template;

updating upload history information related to the received second development file in response to storing the second stored validated data; and updating the first stored validated data for the received first development file to create first updated data based on the second stored validated data for the received second development file and the stored mappings in the table.

2. The method according to claim 1, wherein:
the development process relates to development of a version of a software product.

3. The method according to claim 1, wherein:
each development file is uploaded by a user or application.

4. The method according to claim 1, wherein:
a determination of whether the data is valid is based at least partially upon rules determined for the development process.

5. The method according to claim 1, further including:
providing a user with an ability to highlight an issue relating to the development process; and
allowing a user to run a report for the issue using the stored validated data.

6. The method according to claim 1, further comprising:
allowing a user to submit a change request for an aspect of the development process through a divisional master schedule; and
running a report for the change request.

7. The method according to claim 1, further comprising:
providing a user with an ability to view an upload and download history for the development process.

8. The method of claim 1, further comprising:
receiving a request to generate a report of a status of the project; and
in response to the request, generating the report based on the first updated data for the first development file and the second stored validate data for the second development file, the report including an overview of a status providing an aggregated view of the entire development process across the plurality of sources down to a detailed view of a status for each source and an upload history report based on the upload history information for the first development file and the second development file.

9. A system for tracking information relating to a development process, comprising:
a processor; and
a memory device including instructions that, when executed by the processor, cause the processor to:
receive a first development file from a first source of a plurality of sources, each source of the plurality of sources assigned as responsible for an aspect of the development process, the first development file comprising project planning or project status information for the aspect of the development process for which the first source is responsible and indicating dependencies upon project planning or project status information from a second source of the plurality of sources, the dependencies indicating performance of a second set of one or more tasks being contingent on one or more extents of completion of a first set of one or more tasks;
apply a template to data in the received first development file, wherein applying the template adapts the data in the first development file to a common structure, wherein the common structure supports reporting and tracking of all aspects of the development process across the plurality of sources;
validate the data to identify first validated data after applying the template and notifying the first source when at least some of the data is determined to be invalid;
store the first validated data for the received first development file to create first stored validated data using the common structure and based on applying the template;
store the dependencies between the first development file and project planning or project status information from the second source as mappings to create stored mappings in a table, the stored mappings comprising the dependencies indicating one or more start times associated with the performance of the second set of one or more tasks being contingent on times associated with the one or more extents of completion of the first set of one or more tasks;
update upload history information related to the received first development file in response to storing the first stored validated data;
receive a second development file from a second source of the plurality of sources, the second development file comprising project planning or project status information for the aspect of the development process for which the second source is responsible, and wherein the first development file and the second development file have data structures unique to the respective source;
apply the template to data in the received second development file, wherein applying the template adapts the data in the second development file to the common structure;
validate the data to identity second validated data after applying the template and notifying the second source when at least some of the data is determined to be invalid;
store the second validated data to create second stored validated data for the received second development file using the common structure and based on applying the template;
update upload history information related to the received second development file in response to storing the second stored validated data; and
update the first stored validated data for the received first development file to create first updated data based on the second validated data for the received second development file and the stored mappings in the table.

10. The system according to claim 9, wherein:
the development process relates to development of a version of a software product.

11. The system according to claim 9, wherein:
a determination of whether the data is valid is based at least partially upon rules determined for the development process.

12. The system according to claim 9, wherein the memory device further includes instructions that, when executed by the processor, cause the processor to:
provide a user with an ability to highlight an issue relating to the development process; and allow the user to run a report for the issue using the stored validated data.

13. A non-transitory computer readable having stored thereon a sequence of instructions which, when executed by a processor, cause the processor to track information relating to a development process by:

receiving a first development file from a first source of a plurality of sources, each source of the plurality of sources assigned as responsible for an aspect of the development process, the first development file comprising project planning or project status information for the aspect of the development process for which the first source is responsible and indicating dependencies upon project planning or project status information from a second source of the plurality of sources, the dependencies indicating performance of a second set of one or more tasks being contingent on one or more extents of completion of a first set of one or more tasks;

applying a template to data in the received first development file, wherein applying the template adapts the data in the first development file to a common structure, wherein the common structure supports reporting and tracking of all aspects of the development process across the plurality of sources;

validating the data to identify first validated data after applying the template and notifying the first source when at least some of the data is determined to be invalid;

storing the first validated data for the received first development file to create first stored validated data using the common structure and based on applying the template;

storing the dependencies between the first development file and project planning or project status information from the second source as mappings to create stored mappings in a table, the stored mappings comprising the dependencies indicating one or more start times associated with the performance of the second set of one or more tasks being contingent on times associated with the one or more extents of completion of the first set of one or more tasks;

updating upload history information related to the received first development file in response to storing the first stored validated data;

receiving a second development file from a second source of the plurality of sources, the second development file comprising project planning or project status information for the aspect of the development process for which the second source is responsible, and wherein the first development file and the second development file have data structures unique to the respective source;

applying the template to data in the received second development file, wherein applying the template adapts the data in the second development file to the common structure;

validating the data to identity second validated data after applying the template and notifying the second source when at least some of the data is determined to be invalid;

storing the second validated data to create second stored validated data for the received second development file using the common structure and based on applying the template;

updating upload history information related to the received second development file in response to storing the second stored validated data; and updating the first stored validated data for the received first development file to create first updated data based on the second validated data for the received second development file and the stored mappings in the table.

14. The non-transitory computer readable medium according to claim 13, wherein:

a determination of whether the data is valid is based at least partially upon rules determined for the development process.

* * * * *

UNITED STATES PATENT AND TRADEMARK OFFICE
CERTIFICATE OF CORRECTION

| | |
|---|---|
| PATENT NO. | : 9,495,132 B2 |
| APPLICATION NO. | : 12/349435 |
| DATED | : November 15, 2016 |
| INVENTOR(S) | : O'Mahony et al. |

Page 1 of 1

It is certified that error appears in the above-identified patent and that said Letters Patent is hereby corrected as shown below:

In the Drawings

On sheet 6 of 9, in FIG. 8(a), Line 5, delete "Reqression" and insert -- Regression --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*